Oct. 27, 1964        N. W. HARTZ ETAL        3,154,682
          REMOVAL OF CONTAMINANTS FROM GASES
                   Filed July 21, 1960
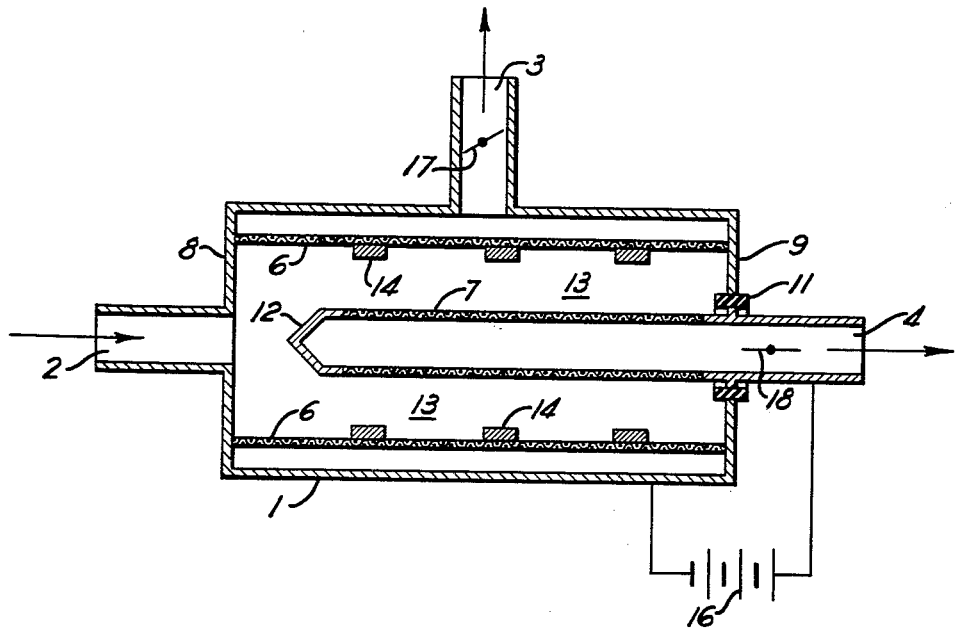
INVENTORS
NELSON W. HARTZ
JOHN P. STRANGE
BY
Brown, Critchlow, Flick & Peckham
THEIR   ATTORNEYS

United States Patent Office 3,154,682
Patented Oct. 27, 1964

3,154,682
REMOVAL OF CONTAMINANTS FROM GASES
Nelson W. Hartz, Churchill Boro, and John P. Strange, Murraysville, Pa., assignors to Mine Safety Appliances Company, a corporation of Pennsylvania
Filed July 21, 1960, Ser. No. 44,330
13 Claims. (Cl. 250—44)

This invention relates to, and has for its primary object the provision of, a method and apparatus for separating electronegative and non-electronegative constituents (as those terms are defined below) of a gaseous mixture by means of an ionization and an electrostatic field, particularly where one of those constituent types is a relatively minor constituent of the gaseous mixture.

As pointed out in a co-pending application of one of the applicants hereto, application Serial Number 716,165, filed February 19, 1958, now U.S. Patent No. 3,009,097, issued November 14, 1961, molecular gases can be classified as belonging either (1) to a type called "electronegative," in which the molecules exhibit electron affinity or an ability to pick up free electrons and form negative ions analogous to similar tendencies of certain well known atomic species, e.g., O, Cl, etc.; or (2) to a type called "non-electronegative," in which the molecules do not exhibit electron affinity and do not form negative ions. This affinity for electrons is not dependent on ionization of the gas and is not to be confused with the affinity of positive ions of an ionized molecule for electrons. Thus, $O_2$, HCl, $SO_2$, $Cl_2$, may be classified as examples of electronegative molecules, since they readily attach electrons to form negative ions. On the other hand, He, Ne, A, $N_2$ and $H_2$, if pure, are examples of gases that do not pick up free electrons and are non-electronegative.

In accordance with this invention, a mixture of electronegative and non-electronegative gases is subjected to a source of ionization, such as bombardment by alpha or beta particles from a radioactive source, and simultaneously or subsequently passed between gas permeable electrodes that produce a potential gradient across the mixture stream. Under the electrostatic forces applied thereto, positive ions, which are formed by the non-electronegative gas when its molecules lose electrons by ionization, will be attracted to the negative electrode; and conversely, negative ions, which are formed by the attachment of free electrons to the electronegative molecules, will be attracted to the positive electrode. Since the electrodes are permeable to gas flow, the separated constituents can be withdrawn from the electrostatic field through the electrodes, for example, by pumping. The original mixture stream will, accordingly, be separated into two separate streams, one of which is free or relatively free of the contaminant gas.

The present invention is illustrated in the accompanying drawing, which shows a diagrammatic cross section of an ionization chamber containing sources of radioactive energy and permeable electrodes.

Referring to the drawing, an ionization and separation chamber 1 in the form of a metal cylinder is provided at one end with a gas inlet 2, a first gas outlet 3 in the side wall of the chamber, and a second gas outlet 4 in the end of the chamber opposite the inlet. Disposed within this chamber are two electrodes 6 and 7 of perforated metal, metal screen, or similar permeable conducting material. Each electrode acts as a partition between the inlet 2 and a separate outlet 3 or 4. Conveniently, the electrodes can be arranged in the form of concentric cylinders. The outer electrode 6 is supported by the ends 8 and 9 of the ionization chamber but spaced from the sidewall thereof, while the inner electrode 7 is mounted on the outlet 4. This outlet is in turn supported by end 9 of the chamber but electrically isolated from the chamber by a ring 11 of insulating material. One end of the inner electrode 6 communicates with the outlet 4; its other end, which is adjacent the inlet 2 has an impermeable portion 12, which serves to divert the mixture stream entering the chamber into the annular space 13 between the two electrodes.

A plurality of sources of ionization 14, such as capsules of radium in equilibrium with its daughter products, are mounted in the chamber, for example, on the inner surface of the outer electrode 6, and serve to ionize the gaseous mixture entering the chamber. A source of electrical potential, such as a battery 16, is connected between the two electrodes, with the positive terminal connected to that electrode (the outer electrode 7 in the embodiment shown) through which it is desired to withdraw the electronegative constituents of the gaseous mixture.

When a mixture of electronegative and non-electronegative gases is pumped into or through the chamber (by means not shown), the mixture is immediately ionized and subjected to the electrical field between the electrodes. The non-electronegative constituents, represented by positive ions, migrate towards the negative or inner electrode 7 and pass therethrough and through the outlet 4. The electronegative constituents, represented by negative ions (i.e., electronegative molecules and attached, formerly free, electrons) migrate toward the positive or outer electrode 6 and pass therethrough and through the outlet 3. Ideally, the relative flow rates of the gas streams through outlets 3 and 4 should conform to the concentrations of the electronegative and non-electronegative gases, respectively, in the original mixture.

Under such conditions, high efficiency separation can be obtained. However, when the contaminant gas to be removed from the mixture is present only in very low concentrations, for example, on the order of 1% or less, it is impracticable to have relative flow rates through the outlets conform with the relative concentrations of the contaminant and pure constituents of the mixture. In such cases, a contaminant enriched stream (containing substantially all of the contaminant constituents and some of the other constituents) is withdrawn through one electrode and a substantially contaminant free stream (the main stream containing the remainder of the other constituents) is withdrawn through the other electrode, and the relative flow rates of the two streams are controlled by a throttle valve in the outlet for the contaminant enriched stream. Two such valves are shown in the drawing, valve 17 in outlet 3 and valve 18 in outlet 4, since the contaminant enriched stream may be withdrawn from either outlet, depending on whether the contaminant is electronegative or non-electronegative. In the drawing, valve 17 is partially closed while valve 18 is fully opened, as they would be in separating a mixture in which the contaminant is electronegative, such as a small amount of oxygen mixed with a large quantity of hydrogen. If it is desired to recover still more of the non-contaminant or purified constituent from the original mixture, the contaminant enriched stream can be reprocessed by passing it in sequence through a number of separation chambers similar to that described above to separate from the contaminant enriched stream more and more of the other or purified constituent.

While it is preferable that ionization of the gaseous mixture take place in the same chamber in which the constituents of the mixture are separated in order that the electrostatic field between the electrodes will be immediately operative to inhibit the recombination of ions and electrons, it will be understood that this invention can also be practiced successfully if the gaseous mixture is ionized before its enters the separation chamber.

It is among the advantages of this invention that it provides simple and inexpensive means for separating electro-negative from non-electronegative constituents of a gaseous mixture, particularly where one of those constituent types is present in relatively small concentrations. Unlike the situation where gas separation is accomplished by adsorption and the adsorbent must be regenerated or replaced from time to time, gas separation in accordance with this invention requires no regeneration and no replacement of material over indefinitely long periods. This invention is equally applicable to the separation of simple gas mixtures consisting of a single electronegative type gas ($O_2$, $CO_2$, $Cl_2$, $SO_2$, CO, HCl, etc.) and a single non-electronegative type gas ($H_2$, He, Ne, A, $N_2$, $C_2H_2$, $C_2H_4$, paraffin hydrocarbons, etc.) and of more complex mixtures involving two or more gases of either or both types.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. The method of separating electronegative and non-electronegative constituents of a gaseous mixture that includes the following steps: subjecting the mixture to a source of ionization, passing the ionized mixture through an electrostatic field between two oppositely charged gas permeable electrodes, and separately withdrawing electronegative constituents of the mixture through one electrode and non-electronegative constituents of the mixture through the other electrode.

2. The method of separating electronegative and non-electronegative constituents of a gaseous mixture that includes the following steps: subjecting the mixture to a source of ionizing energy to produce positive ions and free electrons and to create negative ions from the attachment of free electrons to molecules of the electronegative constituents of the mixture, passing the ionized mixture through an electrostatic field between two oppositely charged gas permeable electrodes to cause negative ions to move toward the anode and positive ions to move toward the cathode, and separately withdrawing electronegative constituents of the mixture through the anode and non-electronegative constituents of the mixture through the cathode.

3. The method according to claim 2, in which the mixture is subjected to the source of ionizing energy simultaneously with its passage through the electrostatic field.

4. The method according to claim 2, that includes the following additional step: adjusting the relative withdrawal rates of the electronegative and non-electronegative constituents to conform approximately to the respective concentrations of those constituents in the original mixture.

5. The method according to claim 2 that includes the following additional step: withdrawing the minor constituent of the original mixture at a lower rate than the rate of withdrawal of the major constituent of the mixture.

6. The method according to claim 2, in which the electronegative constituents of the gaseous mixture include at least one member selected from a group of electronegative gases consisting of oxygen, chlorine, hydrogen chloride, sulfur dioxide, carbon dioxide, and carbon monoxide; and in which the non-electronegative constituents of the gaseous mixture include at least one member selected from a group of non-electronegative gases consisting of hydrogen, helium, neon, argon, nitrogen, ethylene, acetylene, and paraffin hydrocarbons.

7. Apparatus for separating electronegative and non-electronegative constituents of a gaseous mixture, comprising a chamber having a gas inlet and two separate gas outlets, a pair of gas permeable electrodes within the chamber defining a passage between them, the first electrode partitioning the chamber between the inlet and the first outlet, the second electrode partitioning the chamber between the inlet and the second outlet, means within the chamber for ionizing the gaseous mixture to form positive ions and free electrons and to create negative ions from the attachment of free electrons to molecules of the electronegative constituents of the mixture, a source of electrical potential connected across the electrodes for creating an electrostatic potential gradient across the passage between those electrodes, and means for withdrawing gaseous constituents from each outlet.

8. Apparatus according to claim 7, in which the electrodes are in the form of concentric cylinders.

9. Apparatus according to claim 7, in which the ionizing means is a radioactive source mounted adjacent the passage between the electrodes.

10. Apparatus according to claim 7, in which the chamber is in the form of a cylinder with the inlet at one end of the chamber and the first outlet at the opposite end of the chamber, and in which the second outlet is separated from the first outlet by both of the electrodes.

11. Apparatus according to claim 10, in which the first electrode is in the form of a cylinder, one end of which is closed and the other end of which communicates with the first outlet, and in which the second electrode is in the form of a cylinder spaced from and encircling the first electrode and spaced from the sidewall of the chamber.

12. Apparatus according to claim 7, in which means are provided for regulating the flow rate of gas through one of the outlets relative to the flow rate of gas through the other outlet.

13. Apparatus according to claim 7, in which the electronegative constituents of the gaseous mixture contain at least one member selected from the group of electronegative gases consisting of oxygen, chlorine, hydrogen chloride, sulfur dioxide, carbon dioxide and carbon monoxide, and in which the nonelectronegative constituents of the gaseous mixture include at least one member selected from the group of non-electronegative gases consisting of hydrogen, helium, neon, argon, nitrogen, ethylene, acetylene, and paraffin hydrocarbons.

References Cited in the file of this patent

UNITED STATES PATENTS

| | | |
|---|---|---|
| 1,931,436 | Deutsch | Oct. 17, 1933 |
| 2,142,129 | Hoss et al. | Jan. 3, 1939 |
| 2,547,874 | Klema | Apr. 3, 1951 |
| 2,576,616 | Livingston et al. | Nov. 27, 1951 |
| 2,594,777 | Hicks | Apr. 29, 1952 |
| 2,943,196 | Eickhoff | June 28, 1960 |
| 2,950,387 | Brubaker | Aug. 23, 1960 |
| 3,059,110 | Japolsky | Oct. 16, 1962 |

OTHER REFERENCES

Ser. No. 376,930, Peycelon et al. (A.P.C.), published May 25, 1943.

Martin, Jr.: "Production of Unipolar Air With Radium Isotopes," Reprint from Electrical Engineering, January 1954 issue.

Jesse et al.: "Ionization by Alpha Particles in Mixtures of Gases," Physical Review, Dec. 15, 1955, page 1755.